United States Patent [19]

Leiboff

[11] 4,234,145

[45] Nov. 18, 1980

[54] RADIANT ENERGY QUADRANT DETECTION DEVICE

[75] Inventor: Teague N. Leiboff, Redondo Beach, Calif.

[73] Assignee: Northrop Corporation, Los Angeles, Calif.

[21] Appl. No.: 907,154

[22] Filed: May 17, 1978

[51] Int. Cl.$^2$ ............................................. F41G 7/00
[52] U.S. Cl. ................................ 244/3.16; 250/203 R
[58] Field of Search ............................ 244/3.16, 3.13; 250/203 R

[56] References Cited

U.S. PATENT DOCUMENTS

| | | | |
|---|---|---|---|
| 2,969,018 | 1/1961 | Erst et al. | 244/3.16 |
| 3,128,061 | 4/1964 | Chew | 244/3.16 |
| 3,514,608 | 5/1970 | Whetter | 250/203 R |
| 3,657,547 | 4/1972 | Mansfield | 250/203 R |
| 3,744,740 | 7/1973 | Godin et al. | 244/3.16 |
| 4,006,356 | 2/1977 | Johnson et al. | 244/3.16 |
| 4,021,007 | 5/1977 | Coxe | 244/3.13 |

Primary Examiner—Charles T. Jordan
Attorney, Agent, or Firm—Edward A. Sokolski

[57] ABSTRACT

Four radiant energy detectors are arranged in a common plane in a substantially square configuration with each detector occupying a separate quadrant. Infra-red energy received from a target is focused onto the detectors by means of a lens, there being a chopper positioned between the lens and the detectors to chop the radiant energy in a periodic fashion. The outputs of diagonally opposite pairs of detectors are each directly fed to a separate differencing amplifier, where difference signals are generated. These difference signals are then added together and subtracted from each other in separate circuits in a predetermined manner to produce a first signal representing the departure in azimuth of the target from a reference axis running through the center of the detector array, and a second signal representing the departure in elevation of the target from this same axis. The azimuth and elevation signals are separately phase detected in phase detectors which are referenced to the chopper drive signal, the outputs of the phase detectors being filtered in low pass filters to produce DC signals representing the departure in azimuth and elevation of the target from the reference axis. These signals can be fed to an indicator or employed to drive a servo system which slews the support structure for the detectors so as to lock the detectors onto the target.

7 Claims, 9 Drawing Figures

RADIANT ENERGY QUADRANT DETECTION DEVICE

This invention relates to radiant energy detection systems, and more particularly to such a system employing four detectors which lie in a common plane and are arranged in a quadrant configuration.

Radiant energy detection systems which employ four detectors arranged in a common plane in a quadrant configuraton are known in the prior art for detecting the departure in altitude and elevation of a target from an axis which runs through the center of the detector array and normal to the surface plane thereof. Such systems are commonly used for such purposes as gunnery control, and guidance and navigation systems for missiles and other vehicles.

Various such systems are described in the following prior art patents: U.S. Pat. No. 4,021,007 to Coxe, issued May 3, 1977; U.S. Pat. No. 3,128,061 to Chew, issued Apr. 7, 1964; U.S. Pat. No. 2,969,018 to Erst et al, issued Jan. 24, 1961; U.S. Pat. No. 3,657,547 to Mansfield, issued Apr. 18, 1972; U.S. Pat. No. 3,514,608 to Whetter issued May 26, 1970; and U.S. Pat. No. 3,744,740 to Godin et at, issued July 10, 1973. In all of these prior art systems, the outputs of the detectors are first amplified or otherwise processed and then fed to summing and/or subtracting circuits where the signals are variously added and subtracted to generate the desired azimuth and elevation signals.

The system of the present invention is an improvement over such prior art systems in several respects. First, the device of the present invention has a highly compact construction wherein the detector elements and the electronic processing circuitry for generating the azimuth and elevation signals are combined together in a common housing to make for a miniature assembly. Further, the output of the detectors is fed directly to subtracting circuitry which is located in close proximity thereto, thereby enabling the efficient cancellation and minimization of noise signals to make for a high signal to noise ratio. Further, the system of the present invention employs an efficient full wave detector for its phase demodulators which provides a substantial improvement in sensitivity over prior art detectors.

It is therefore an object of this invention to provide an improved radiant energy detection system of highly compact proportions.

It is a further object of this invention to provide a radiant energy detection system having a higher signal to noise ratio than prior art systems.

It is still a further object of this invention to provide an improved radiant energy detection system in which the detection elements and the electronic circuitry operating therewith are assembled together in a single assembly which lends itself to highly compact construction.

Other objects of this invention will become apparent as the description proceeds in connection with the accompanying drawings, of which:

Briefly described, my invention is as follows:

Four radiant energy detectors are arranged in an array lying in a single plane with the detectors being positioned to cover four quadrants. A lens is mounted in front of the detector array to focus radiant energy from a target onto the array, there being a chopper positioned between the lens and the detectors to chop the radiant energy. The detectors are mounted on a heat sink along with a thermoelectric cooler. The detector assembly formed by the detector array and its associated cooler and heat sink are mounted on a casing frame in which electronic circuitry for processing the detector outputs to provide signals in accordance with the departure of the target in azimuth and elevation from an axis running through the center line of the detector array is contained. The outputs of the detectors are fed directly to subtraction circuits positioned in close proximity thereto. The outputs of diagonally opposite pairs of the detectors are subtracted from each other, and these subtracted signals then added together in a predetermined manner to produce a first signal in accordance with target azimuth, and a second signal in accordance with target elevation. Each of these signals is appropriately detected in a phase detector, the outputs of the phase detectors each being filtered in a low pass filter to provide smooth DC signals representing azimuth and elevation "errors" respectively. The azimuth and elevation signals can be utilized either to drive a servo system employed to enable the detector to track the target, or to provide an indication of target azimuth and elevation on a suitable indicator device.

Figure 1:
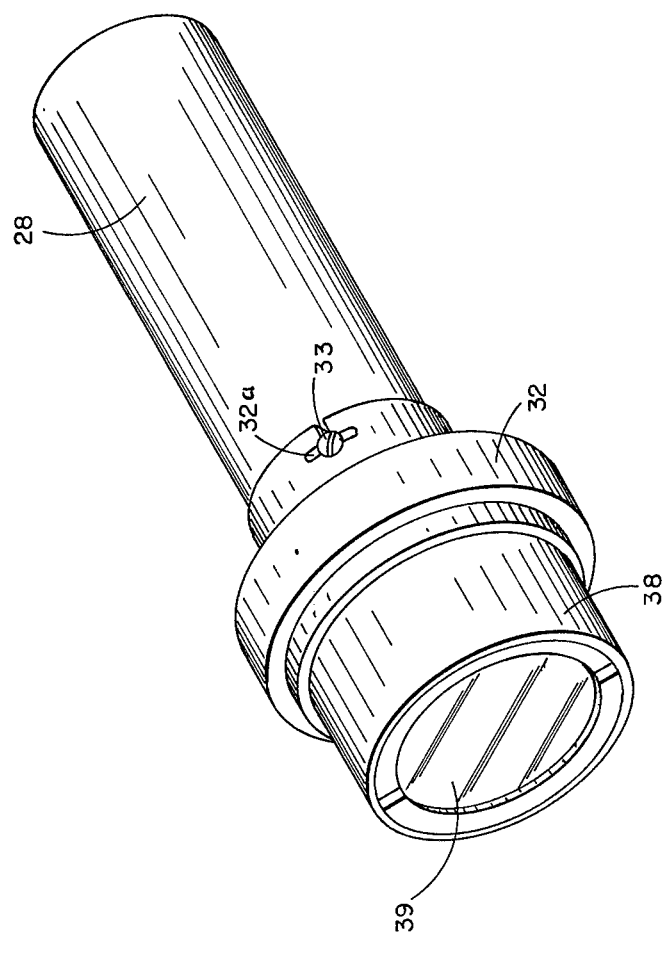
FIG. 1 is a perspective view of a preferred embodiment of the invention.
Figure 2:
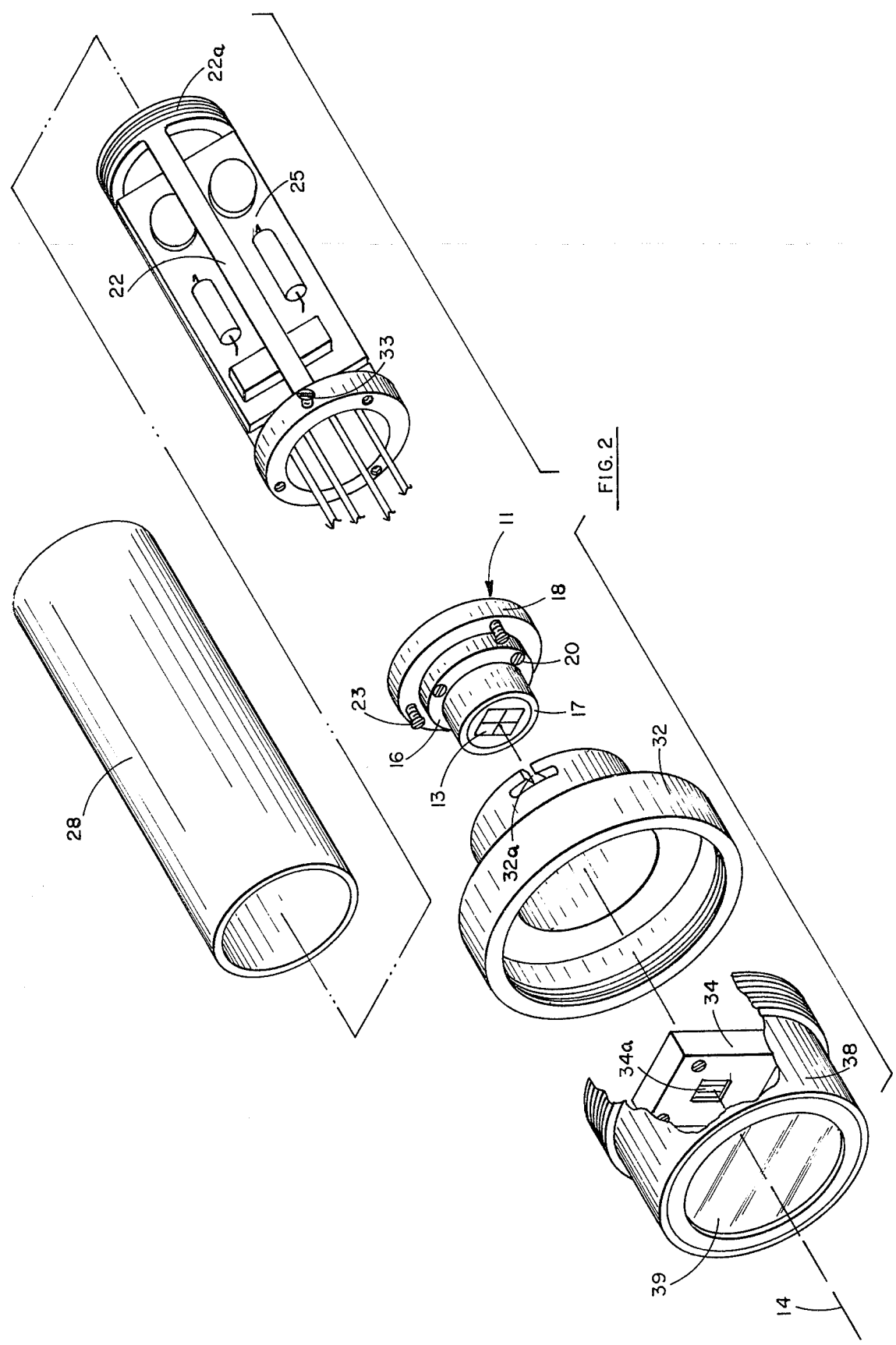
FIG. 2 is an exploded view of the preferred embodiment.

Referring now to FIGS. 1 and 2, the structure of the preferred embodiment is illustrated. Detector assembly 11 includes a detector array 13 having four detector elements arranged in a square, each detector element occupying a separate one of four quadrants. The detector elements are all located in a common plane. The detection axis 14 of the system passes through the center of array 13 and extends normally from the front surface thereof. Detector assembly 11 also includes a thermo electric cooler 16 on which the detector array 13 is mounted. Detector array 13 is mounted within a casing 17 which houses the detectors and provides mechanical support therefor on thermo-electric cooler 16. It is to be noted that the detectors are of a lead selenide type (PbSe) and therefore require cooling. Thermo-electric cooler 16 is mounted on disc shaped heat sink 18 by means of bolts 20, the heat sink in turn being supported on frame 22 by means of bolts 23.

Mounted on frame 22 is electronic circuitry 25 used for processing the outputs of the detectors to produce azimuth and elevation error signals. Cover 28 is provided to cover up and shield electronic circuitry 25 and threadably engages the threaded end portion 22a of the frame. Mounted over detector assembly 11 and bolted to frame 22 by means of bolts 33 is cylindrical detector assembly cover 32, with slotted portions 32a of the cover fitting under the bolts. Optical chopper 34 is mounted within lens casing 38 behind lens 39. Chopper 34 is a commercially available tuned reed chopper which outputs an AC synchronizing signal. Chopper 34 has a shutter 34a which opens and closes in a periodic manner in response to and at the natural frequency of the reed chopper unit. Lens assembly 38 which includes a lens 39 for focusing radiant energy onto the detector array is threadably mounted on cover 32.

Figure 3:
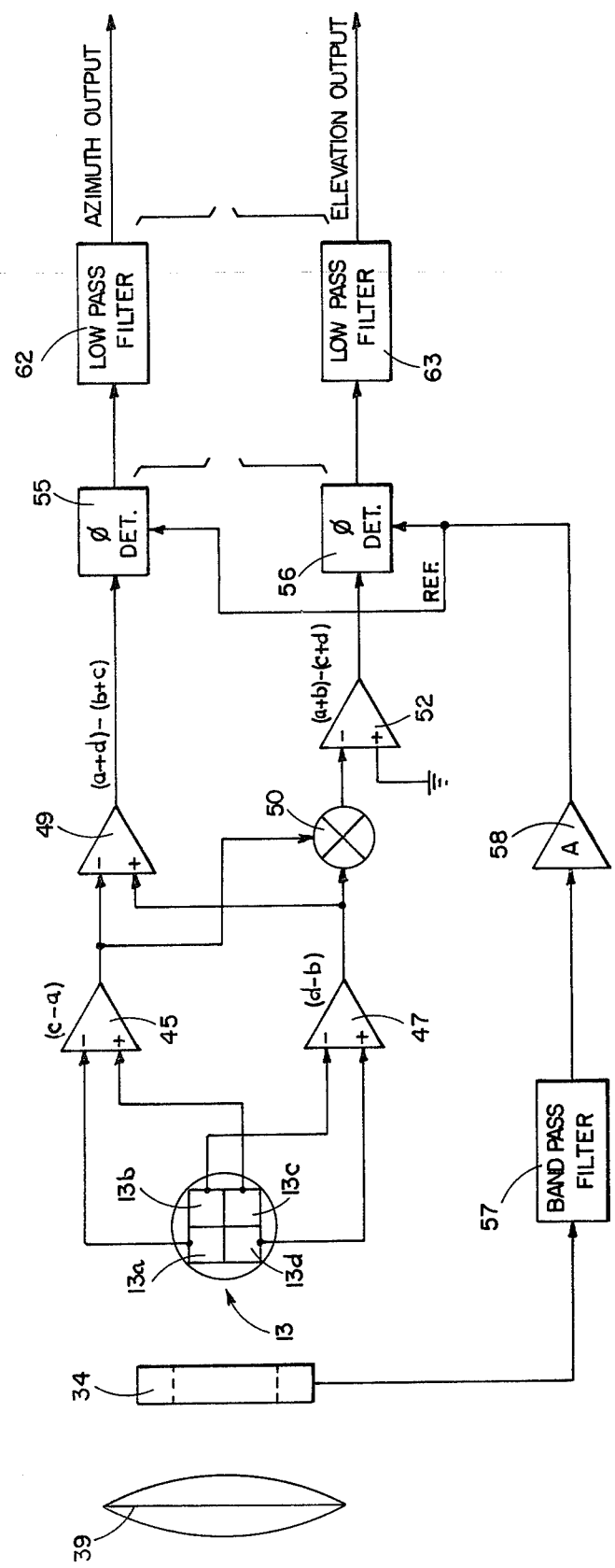
FIG. 3 is a schematic drawing illustrating the circuitry of the preferred embodiment.
Figure 4:
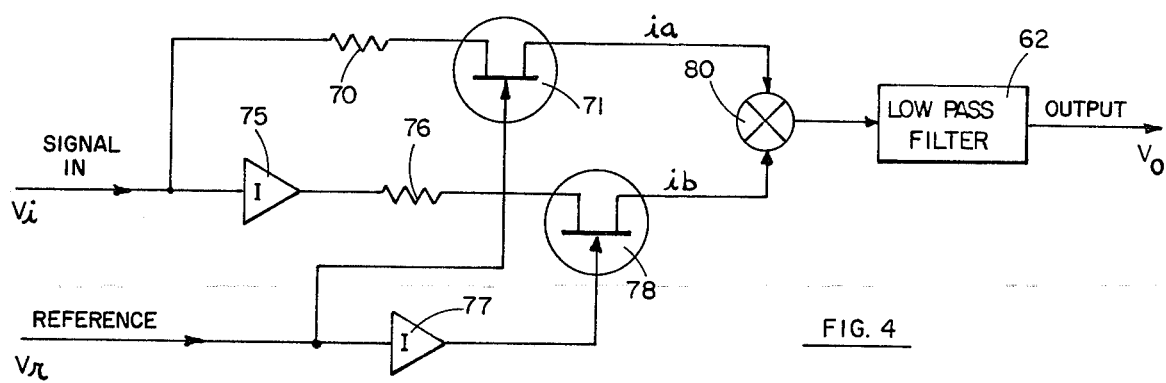
FIG. 4 is a schematic drawing of the detector circuit employed in the preferred embodiment.

Referring now to FIG. 3, a preferred embodiment of the electronic circuitry of the invention is schematically illustrated. Radiant energy from a target is focused by means of lens 39 onto detector array 13. Prior to reaching the detector array, the radiant energy is chopped by means of chopper 34 which is located between lens 39 and detector array 13. Chopper 34 operates at its natural synchronous frequency, a typical such chopping frequency being of the order of 400 Hertz.

Detector array 13 includes four detectors 13a–13d. The detectors are all located in a common plane and are in a square configuration, each detector occupying a separate quadrant of the square.

The outputs of detectors 13a and 13c are fed directly to differential amplifier 45, while the outputs of detector units 13b and 13d are fed directly to differential amplifier 47. The output of amplifier 45 is the difference between the outputs of detectors 13a and 13c (c−a) while the output of amplifier 47 is the difference between the outputs of detectors 13d and 13b (d−b). The output of amplifier 45 is subtracted from the output of amplifier 47 in differential amplifier 49, to produce an output signal (a+d)−(b+c), which represents the azimuth error signal. The output of amplifier 45 is summed with the output of amplifier 47 in summing device 50 and this summed signal fed to the negative input of differential amplifier 52. The output of amplifier 52 is (a+b)−(c+d), which represents the elevation error signal.

The output of amplifier 49 is fed to phase detector 55, while the output of amplifier 52 is fed to phase detector 56. The phase detectors both receive a reference signal generated by the reed chopper 34. This synchronization signal is filtered in band pass filter 57, the output of which is amplified by means of amplifier 58. The outputs of phase detector 55 and 56 are fed to low pass filters 62 and 63 respectively, which operate to smooth the DC output signals. Low pass filters 62 and 63 typically have a cutoff frequency of 40 Herz. The output of low pass filter 62 represents the azimuth error signal, while the output of low pass filter 63 represents the elevation error signal. These signals may be fed to an indicator to provide an indication of azimuth and elevation error, or may be used to drive a servo system which in turn slews the detector electronics assembly so that it tracks the target. The servo of course can also be utilized to control gunnery, a guidance system, etc.

Figure 5A:
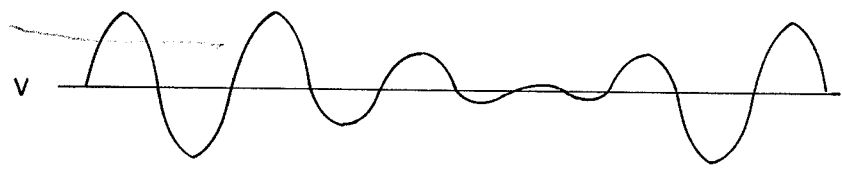
FIGS. 5A–5E are a series of wave form diagrams illustrating the operation of the detector circuit of FIG. 4.
Figure 5B:
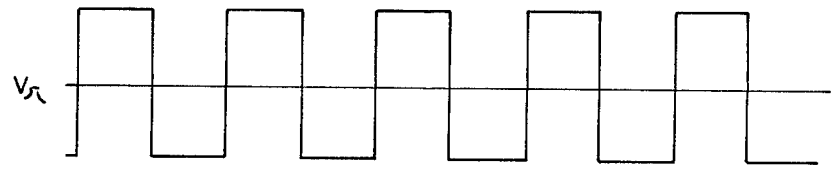
Figure 5C:
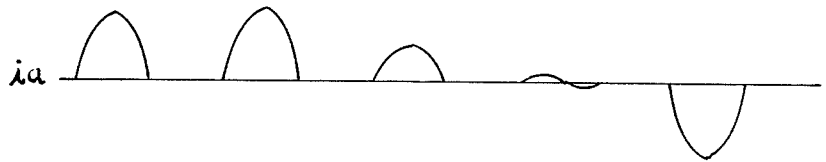
Figure 5D:
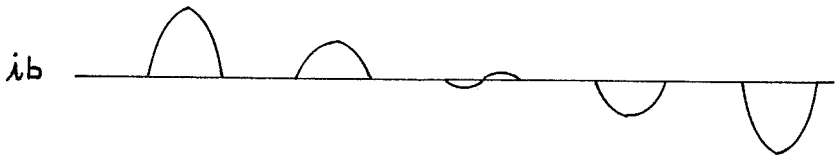
Figure 5E:
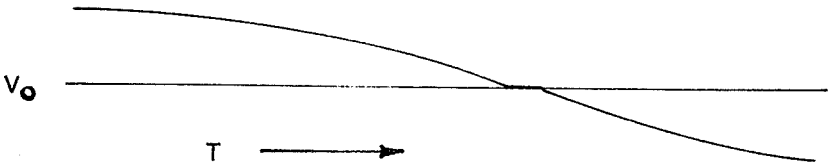

Referring now to FIG. 4 and FIGS. 5A–5E, a preferred embodiment of the phase detectors of the system of the invention are schematically illustrated in conjunction with waveforms. A typical input signal (Vi) which may be received by phase detector 55 from amplifier 49 is shown in FIG. 5A. This input signal is fed through resistor 70 to the source of FET 71. The gate of FET 71 receives the reference signal (Vr) shown in FIG. 5B. The output of FET 71 is signal $i_a$ shown in FIG. 5C which as can be seen from the waveforms represents the input signal ($V_i$) as gated on and off by the reference signal ($V_r$). The input signal, Vi is also fed through inverting amplifier 75 through resistor 76 to the source of FET 78. The reference signal ($V_r$ is fed through inverting amplifier 77 to the gate of FET 78. Thus, the output ($i_b$) of FET 78 which is shown in FIG. 5D represents the negative going portions of the input ($V_i$), flipped over 180°. The outputs $i_a$ and $i_b$ are summed together in summing device 80 and fed to low pass filter 62, the output of which ($V_o$) is shown in FIG. 5E.

Thus, the phase detectors of the present invention provide full wave detection, thereby affording greater sensitivity of response. The output ($V_o$) is a DC signal which has an amplitude which varies as a function of the departure of the target in azimuth and elevation, as the case may be, from the central axis 14 of the detector array, shown in FIG. 2.

While the invention has been described and illustrated in detail, it is to be clearly understood that this is intended by way of illustration and example only, and is not to be taken by way of limitation, the spirit and scope of this invention being limited only by the terms of the following claims.

I claim:

1. A radiant energy detector device for generating output signals representing the departure in altitude and azimuth of a target from a predetermined reference axis, comprising:
   a. an array of four radiant energy detectors arranged in a common plane in a substantially square configuration, each of said detectors occupying a separate quadrant of the square,
   b. a frame,
   c. means for mounting said detector array on said frame,
   d. a lens for focusing radiant energy from said target onto the detector array,
   e. means for supporting said lens on the frame,
   f. chopper means mounted in the lens supporting means and positioned between the lens and the detector array for chopping the radiant energy focused onto the target array,
   g. synchronizing circuit means for generating a synchronous drive signal from said chopper means,
   h. a pair of electronic circuit means mounted on said frame in proximity to said detector array, each for directly receiving the outputs of a diagonally opposite pair of the detectors and subtracting each of said paired outputs from each other,
   i. summing circuit means mounted on said frame for receiving the outputs of said pair of electronic circuit means and summing said last mentioned outputs together in a predetermined manner to provide a first signal in accordance with the departure in azimuth of the target from a predetermined axis and a second signal in accordance with the departure in elevation of the target from said axis,
   j. first and second phase detector circuit means mounted on said frame for receiving said first and second signals respectively and a reference signal from said synchronizing circuit means, and generating pulsating DC signals in response thereto, and
   k. first and second filter circuit means mounted on said frame for receiving the outputs of said first and second detector circuit means respectively for producing smooth DC signals representing the departure in azimuth and elevation of the target from said reference axis.

2. The detector device of claim 1 wherein the means for mounting the detector array on the frame comprises a heat sink member bolted to the frame, the detector array being mounted on the heat sink member.

3. The detector device of claim 2 wherein the mounting means additionally includes a thermo-electric cooler to which the detector array is fixedly attached, said thermo-electric cooler being bolted to the heat sink.

4. The detector device of claim 1 and further including a cylindrical cover covering said frame and surrounding all of said circuit means, 5. The detector device of claim 4 wherein the means for supporting the lens on the frame comprises a hollow cylindrical member on which the lens is mounted and a hollow cylindrical cover to which the first mentioned hollow cylindrical member is attached, said cover being attached to said frame and being mounted over the array of detectors to provide a cover therefor.

6. The detector device of claim 3 wherein the heat sink member is disc shaped and the thermo-electric cooler has a disc shape smaller in diameter than that of said heat sink member and is mounted in concentricity therewith.

7. The detector device of claim 1 wherein each of the phase detector circuit means comprises full wave detectors, each of said detectors including a first detector element for generating a varying DC output in response to the direct outputs of the summing means and the direct output of said synchronizing circuit means, a second detector element for generating a varying DC output in response to the inverted outputs of the summing means and the inverted output of said synchronizing circuit means and means for summing the outputs of said detector elements.

* * * * *